United States Patent
Hickie

(10) Patent No.: US 11,460,115 B2
(45) Date of Patent: Oct. 4, 2022

(54) GATE VALVE INCLUDING VALVE BORE ASSEMBLY

(71) Applicant: TECH ENERGY PRODUCTS, L.L.C., Bossier City, LA (US)

(72) Inventor: Barton Hickie, Oklahoma City, OK (US)

(73) Assignee: TECH ENERGY PRODUCTS, L.L.C., Bossier City, LA (US)

( * ) Notice: Subject to any disclaimer, the term of this patent is extended or adjusted under 35 U.S.C. 154(b) by 0 days.

(21) Appl. No.: 17/155,262

(22) Filed: Jan. 22, 2021

(65) Prior Publication Data

US 2021/0222777 A1 Jul. 22, 2021

Related U.S. Application Data

(60) Provisional application No. 62/964,496, filed on Jan. 22, 2020.

(51) Int. Cl.
  *F16K 3/26* (2006.01)
  *F16K 27/04* (2006.01)
  *F16K 3/02* (2006.01)

(52) U.S. Cl.
  CPC ............... *F16K 3/262* (2013.01); *F16K 3/02* (2013.01); *F16K 3/0272* (2013.01); *F16K 3/267* (2013.01); *F16K 27/044* (2013.01)

(58) Field of Classification Search
  CPC . F16K 3/262; F16K 3/02; F16K 3/267; F16K 27/044; F16K 3/0272
  USPC .......................... 251/326–329, 360–363, 367
  See application file for complete search history.

(56) References Cited

U.S. PATENT DOCUMENTS

| | | | | |
|---|---|---|---|---|
| 2,834,097 A | * | 5/1958 | Eichenberg | F16K 27/105 29/890.131 |
| 2,893,684 A | * | 7/1959 | Williams | F16K 27/044 251/328 |
| 2,934,313 A | * | 4/1960 | Allen | F16K 27/044 251/328 |
| 3,158,352 A | * | 11/1964 | Grove | F16K 27/044 251/329 |
| 3,356,334 A | * | 12/1967 | Scaramucci | F16K 3/0227 251/172 |
| 4,033,550 A | * | 7/1977 | Wheatley | F16K 3/0263 251/328 |
| 4,236,692 A | | 12/1980 | Williamson | |
| 4,688,597 A | * | 8/1987 | Clarkson | F16K 3/0227 137/375 |
| 4,741,509 A | * | 5/1988 | Bunch | F16K 3/0236 251/172 |
| 5,020,774 A | * | 6/1991 | Christianson | F16K 3/32 251/129.15 |

(Continued)

OTHER PUBLICATIONS

International Search Report and Written Opinion for corresponding International Patent Application No. PCT/IB21/50494, dated Jul. 14, 2021; 18 pages.

*Primary Examiner* — John Bastianelli
(74) *Attorney, Agent, or Firm* — Haynes and Boone, LLP

(57) ABSTRACT

A gate valve including a valve body, a gate assembly, an operating end, a balancing end, and a valve bore assembly. The valve bore assembly includes two sets of components positioned on either side of the gate assembly to maintain the axial alignment of the gate assembly within the valve body during actuation between an open configuration and a closed configuration.

5 Claims, 10 Drawing Sheets

(56) References Cited

U.S. PATENT DOCUMENTS

| | | | | |
|---|---|---|---|---|
| 5,271,426 A | * | 12/1993 | Clarkson | F16K 3/0281 |
| | | | | 137/375 |
| 5,330,158 A | * | 7/1994 | Ellich | F16K 3/0281 |
| | | | | 251/327 |
| 5,836,570 A | | 11/1998 | Blenkush et al. | |
| 2018/0087673 A1 | * | 3/2018 | Scott | F16K 25/04 |
| 2019/0264818 A1 | * | 8/2019 | Powell | F16K 27/044 |

* cited by examiner

GATE VALVE INCLUDING VALVE BORE ASSEMBLY

CROSS-REFERENCE TO RELATED APPLICATION

This application claims the benefit of the filing date of, and priority to, U.S. Application No. 62/964,496, filed Jan. 22, 2020, the entire disclosure of which is hereby incorporated herein by reference.

BACKGROUND

The present disclosure relates generally to valves and, more particularly, to a gate valve including a valve bore assembly, the gate valve adapted to be used in, for example, oil and gas operations.

DETAILED DESCRIPTION

Figure 1:
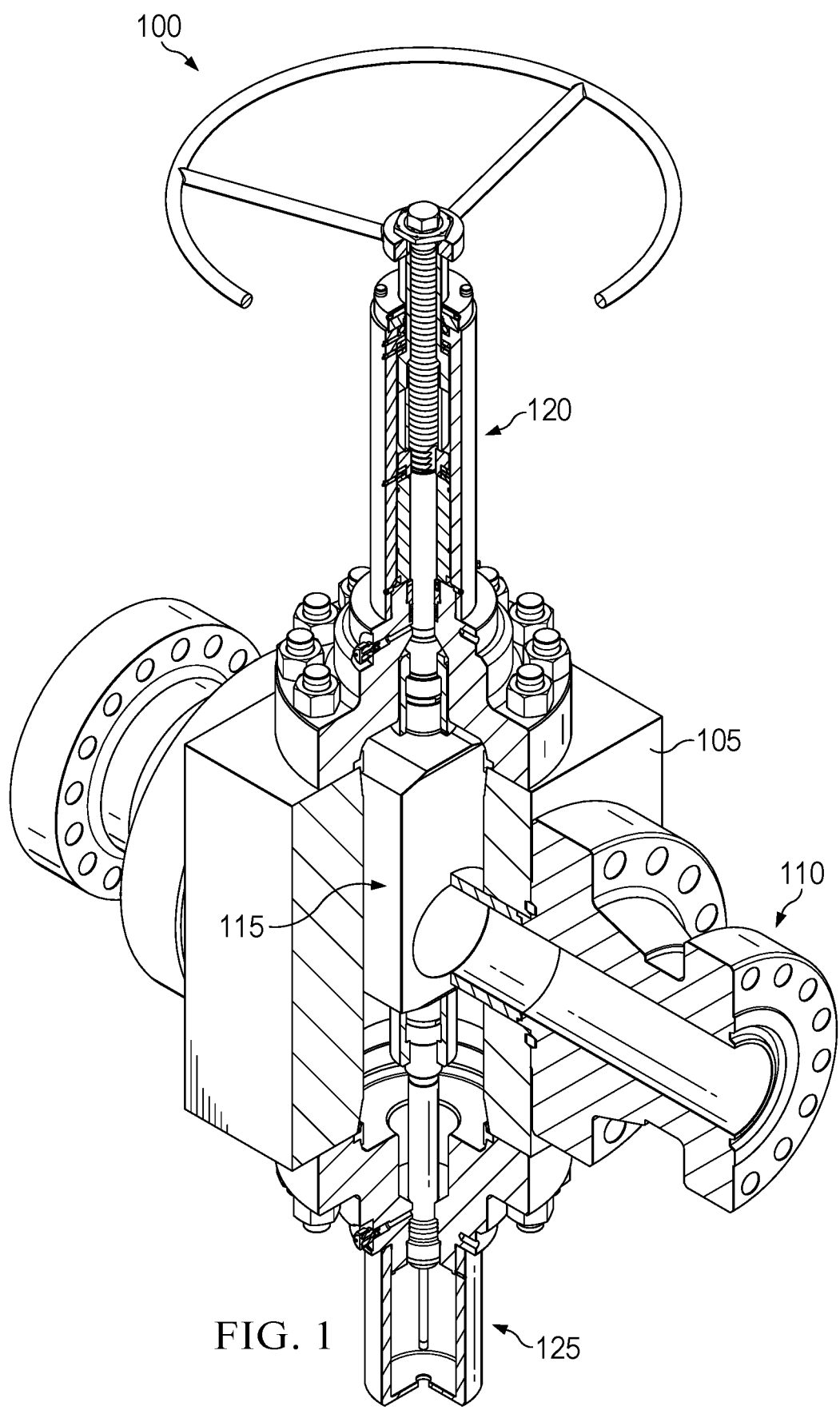
FIG. 1 is a partially-sectioned top perspective view of a gate valve, according to one or more embodiments.

Referring to FIG. 1, in an embodiment, a gate valve is generally referred to by the reference numeral 100 and includes a valve body 105, a valve bore assembly 110, a gate assembly 115, an operating end 120, and a balancing end 125. The valve bore assembly 110 is engaged with the valve body 105. The gate assembly 115 extends within the valve body 105 and is accommodated by the valve bore assembly 110. The gate assembly 115 is enclosed within the valve body 105, the operating end 120, and the balancing end 125. The operating end 120 is coupled to the valve body 105 and adapted to actuate the gate assembly 115 between an open configuration, in which a fluid is permitted to flow through the valve body 105, and a closed configuration, in which fluid is prevented from flowing through the valve body 105. The balancing end 125 is coupled to the valve body 105, opposite the operating end 120. The balancing end 125 receives a portion of the gate assembly 115 and balances axial forces such as, for example, hydraulic lift forces, which are exerted on the gate assembly 115 during operation of the gate valve 100. The valve bore assembly 110 includes two sets of components positioned on either side of the gate assembly 115 to maintain the axial alignment of the gate assembly 115 within the valve body 105 during actuation between the open configuration and the closed configuration.

Figure 2:
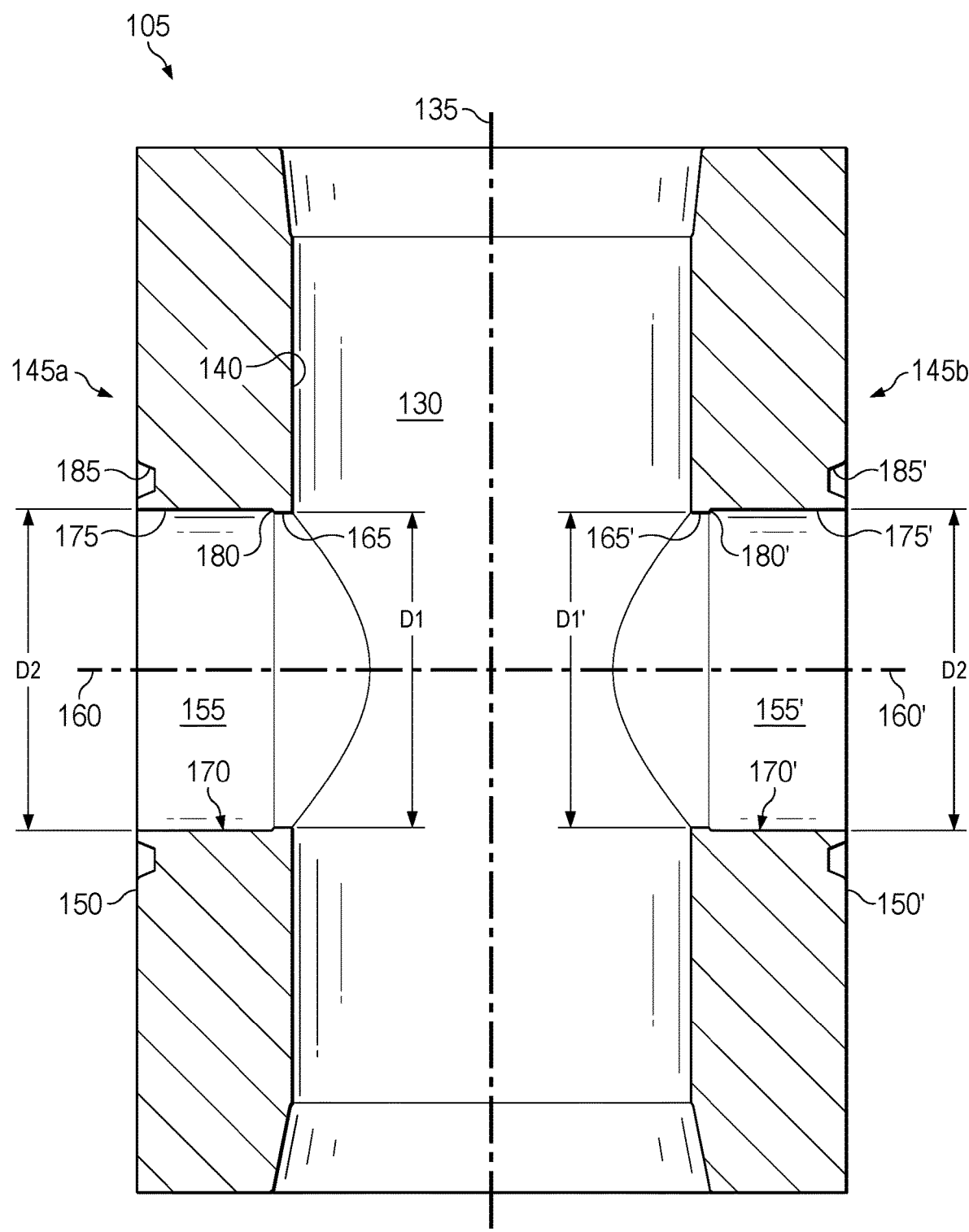
FIG. 2 is a cross-sectional view of a valve body of FIG. 1's gate valve, according to one or more embodiments.

Referring to FIG. 2, with continuing reference to FIG. 1, in an embodiment, the valve body 105 includes a valve cavity 130, such as, for example, a passage or bore, extending therethrough along a longitudinal axis 135. The valve cavity 130 defines an interior surface 140 in the valve body 105, which valve body 105 defines an inlet side 145a and an outlet side 145b. An exterior surface 150 is defined in the valve body 105 at the inlet side 145a. An inlet passageway 155 extends through the exterior surface 150, along a longitudinal axis 160, and into the valve cavity 130. In some embodiments, the longitudinal axis 160 is perpendicular to the longitudinal axis 135. The inlet passageway 155 defines an interior surface 165 in the valve body 105 having an inside diameter D1. The interior surface 165 adjoins the interior surface 140. An annular recess 170 is formed into the interior surface 165. The annular recess 170 defines an interior surface 175 and an internal shoulder 180 in the valve body 105. The interior surface 175 has an inside diameter D2 that is greater than the inside diameter D1. The internal shoulder 180 faces away from the valve cavity 130 and adjoins both the interior surface 165 and the interior surface 175. In some embodiments, as in FIG. 2, the interior surface 175 also adjoins the exterior surface 150. An annular groove 185 is formed into the exterior surface 150 around the inlet passageway 155 and the annular recess 170.

Referring still to FIG. 2, in an embodiment, the outlet side 145b of the valve body 105 includes various features that are substantially identical to corresponding features of the inlet side 145a, which substantially identical features are given the same reference numerals, except that the suffix """ is added.

Although the terms "inlet" and "outlet" used herein may imply a direction of fluid flow from the inlet side 145a to the outlet side 145b of the valve body 105, depending on relative pressures within the gate valve 100, fluid may instead flow in the opposite direction, that is, from the outlet side 145b to the inlet side 145a of the valve body 105. Accordingly, as used herein, the term "inlet" may refer to an "outlet" and the term "outlet" may refer to an "inlet."

Figure 3A:
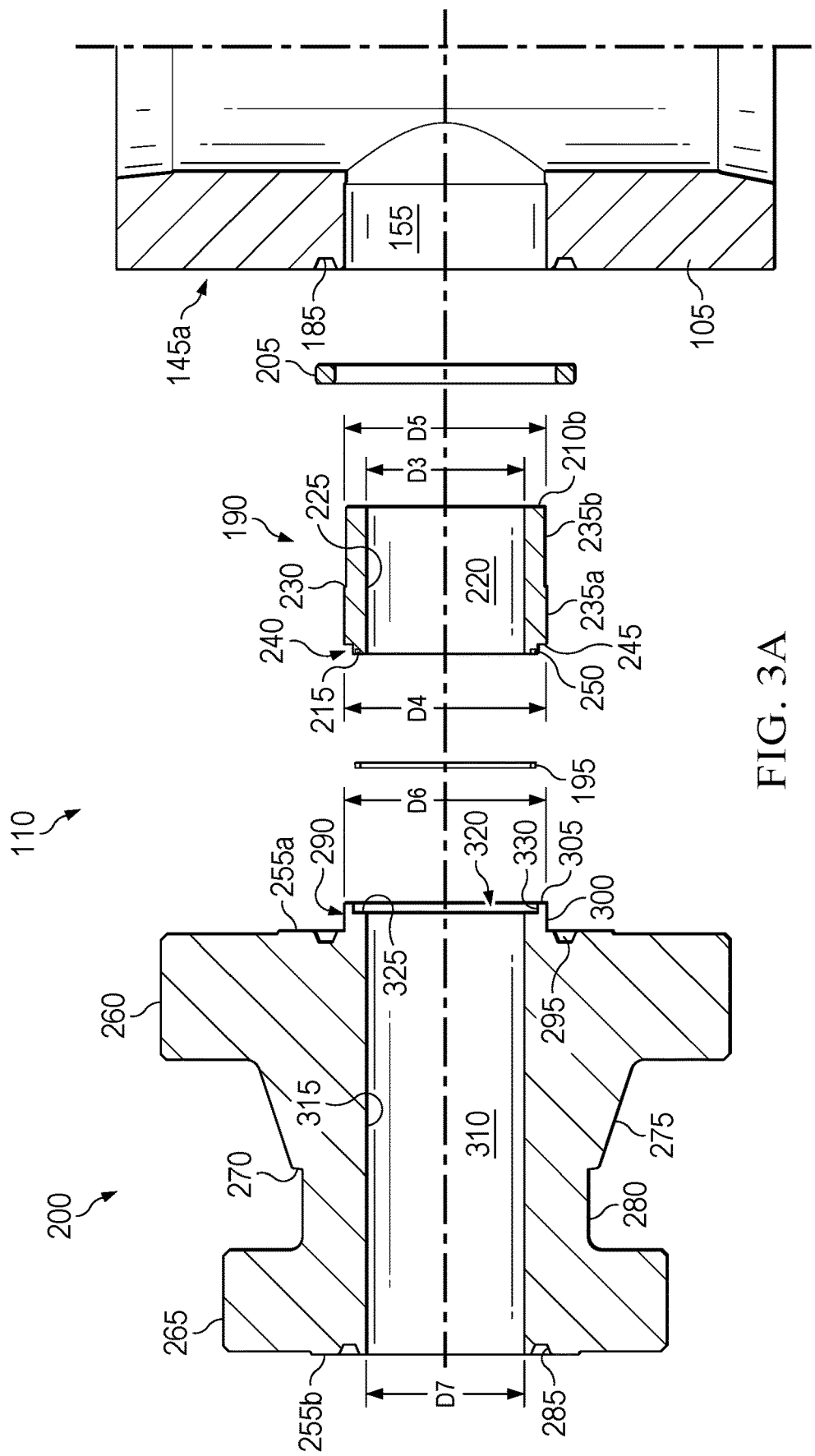
FIG. 3A is an exploded cross-sectional view of a first portion of a valve bore assembly of FIG. 1's gate valve corresponding to an inlet side of FIG. 2's valve body, according to one or more embodiments.

Referring to FIG. 3A, with continuing reference to FIG. 2, in an embodiment, the valve bore assembly 110 includes a valve seat 190, a seal 195, a bore body 200, and a seal 205, all of which are associated with the inlet side 145a of the valve body 105. The valve seat 190 defines opposing end faces 210a and 210b. An annular groove 215 is formed in the end face 210a. The annular groove 215 is adapted to accommodate the seal 195. In some embodiments, the seal 195 is an O-ring. A fluid bore 220 extends longitudinally through the valve seat 190, including the opposing end faces 210a and 210b. The fluid bore 220 defines an interior surface 225 in the valve seat 190 having an inside diameter D3. The valve seat 190 further defines an external shoulder 230 facing away from the end face 210a and toward the end face 210b. An exterior surface 235a extends between the external shoulder 230 and the end face 210a. The exterior surface 235*a* adjoins the external shoulder 230 and has an outside diameter D4. The outside diameter D4 is less than the inside diameter D2 of the interior surface 175 of the valve body 105. In some embodiments, an annular groove is formed into the exterior surface 235*a* to accommodate a seal adapted to sealingly engage the valve seat 190 and the valve body 105. An annular recess 240 is formed into both the exterior surface 235*a* and the end face 210*a*. The annular recess 240 defines a seat face 245 and an exterior surface 250 in the valve seat 190. The seat face 245 adjoins the exterior surfaces 235*a* and 250. The exterior surface 250 adjoins the end face 210*a*. Alternatively, the annular recess 240 may be omitted; for example, the annular recess 240 may be replaced by another annular recess formed into both the interior surface 225 and the end face 210*a*. An exterior surface 235*b* extends between the external shoulder 230 and the end face 210*a*. The exterior surface 235*b* adjoins the external shoulder 230 and has an outside diameter D5, which is less than the outside diameter D4. The outside diameter D5 is also less than the inside diameter D1 of the interior surface 165 of the valve body 105. In some embodiments, as in FIG. 3, the exterior surface 235*b* also adjoins the end face 210*b*. In some embodiments, an annular groove is formed into the exterior surface 235*b* to accommodate a seal adapted to sealingly engage the valve seat 190 and the valve body 105.

The bore body 200 defines opposing end faces 255*a* and 255*b*. An outer flange 260 extends proximate the end face 255*a*. In some embodiments, as in FIG. 3, the end face 255*a* is slightly raised relative to the outer flange 260. Likewise, an outer flange 265 extends proximate the end face 255*b*. In some embodiments, as in FIG. 3, the end face 255*b* is slightly raised relative to the outer flange 265. The bore body 200 further defines an external shoulder 270 facing away from the outer flange 260 and toward the outer flange 265. An exterior surface 275 extends between the external shoulder 270 and the outer flange 260. The exterior surface 275 is tapered outwardly from the external shoulder 270 to the outer flange 260. In some embodiments, as in FIG. 3, the exterior surface 275 is frustoconical. Likewise, an exterior surface 280 extends between the external shoulder 270 and the outer flange 265. An annular groove 285 is formed in the end face 255*b*. The annular groove 285 is adapted to accommodate a seal to facilitate sealingly coupling the bore body 200 to an adjacent flow component via the flange 265. A boss 290 extends from the end face 255*a*. An annular groove 295 is formed in the end face 255*a*, around the boss 290. The annular groove 295 is adapted to accommodate the seal 205. In some embodiments, the seal 205 is a BX seal ring. In some embodiments, the seal 205 is a Grayloc seal ring. The boss 290 defines an exterior surface 300 and an end face 305. The exterior surface 300 adjoins the end face 255*a* and has an outside diameter D6. The outside diameter D6 is less than the inside diameter D2 of the interior surface 175 of the valve body 105. The end face 305 adjoins the exterior surface 300, opposite the end face 255*a*. A fluid bore 310 extends longitudinally through the bore body 200, including the end faces 255*b* and 305. The fluid bore 310 defines an interior surface 315 in the bore body 200 having an inside diameter D7. In some embodiments, the inside diameter D7 is the same as the inside diameter D3 of the interior surface 225 of the valve seat 190. An annular recess 320 is formed into both the interior surface 315 and the end face 305. The annular recess 320 defines a sealing face 325 and an interior surface 330 in the bore body 200. The sealing face 325 adjoins the interior surface 315. The interior surface 330 adjoins both the sealing face 325 and the end face 305. Alternatively, the annular recess 320 may be omitted; for example, the annular recess 320 may be replaced by another annular recess formed into both the exterior surface 300 and the end face 305.

Figure 3B:
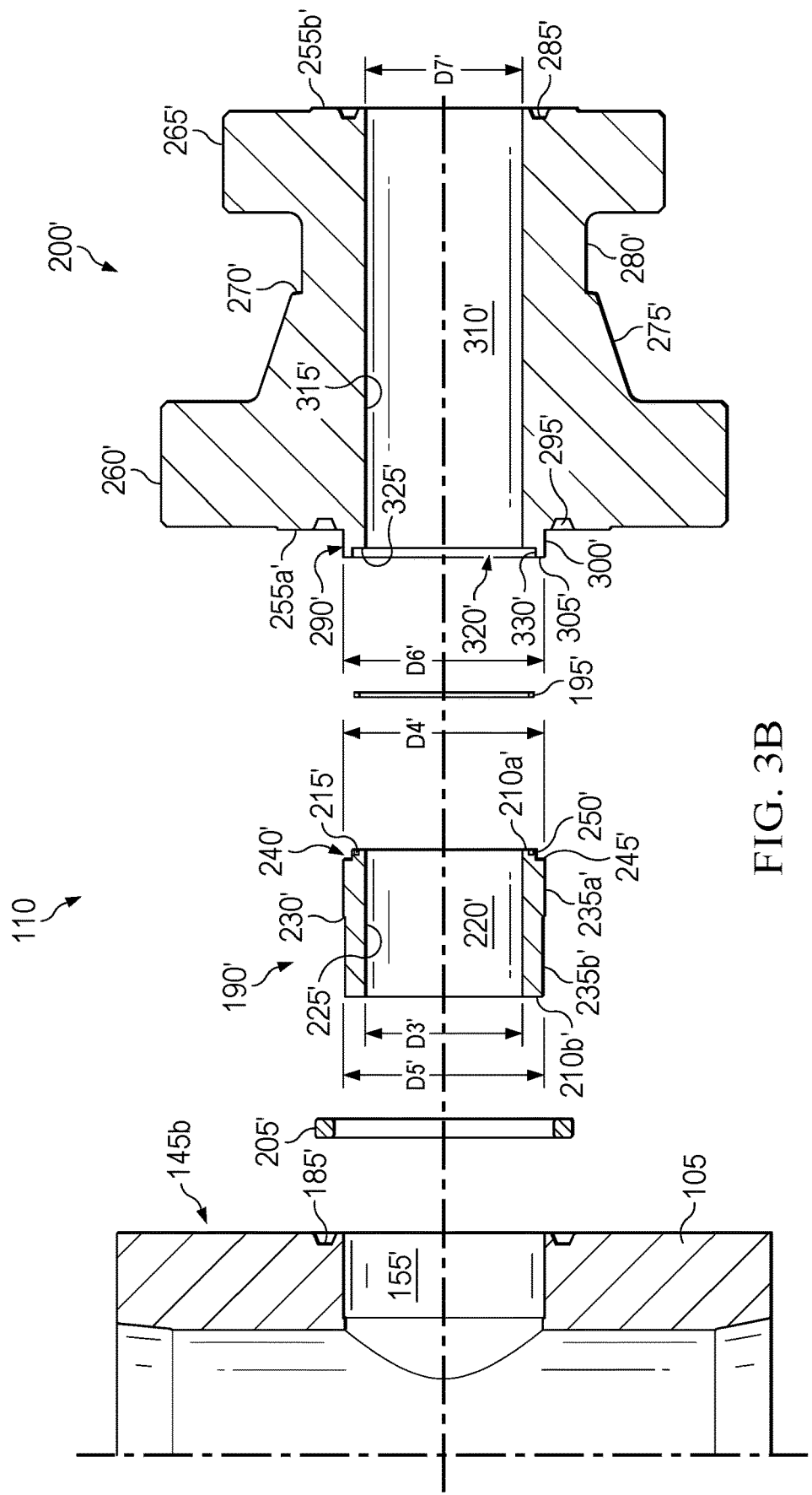
FIG. 3B is an exploded cross-sectional view of a second portion of the valve bore assembly of FIG. 1's gate valve corresponding to an outlet side of FIG. 2's valve body, according to one or more embodiments.

Referring to FIG. 3B, with continuing reference to FIG. 3A, in an embodiment, in addition to the valve seat 190, the seal 195, the bore body 200, and the seal 205, all of which are associated with the inlet side 145*a* of the valve body 105, the valve bore assembly 110 includes various substantially identical features/components associated with the outlet side 145*b* of the valve body 105, which substantially identical features/components are given the same reference numerals, except that the suffix "'" is added.

Figure 4:
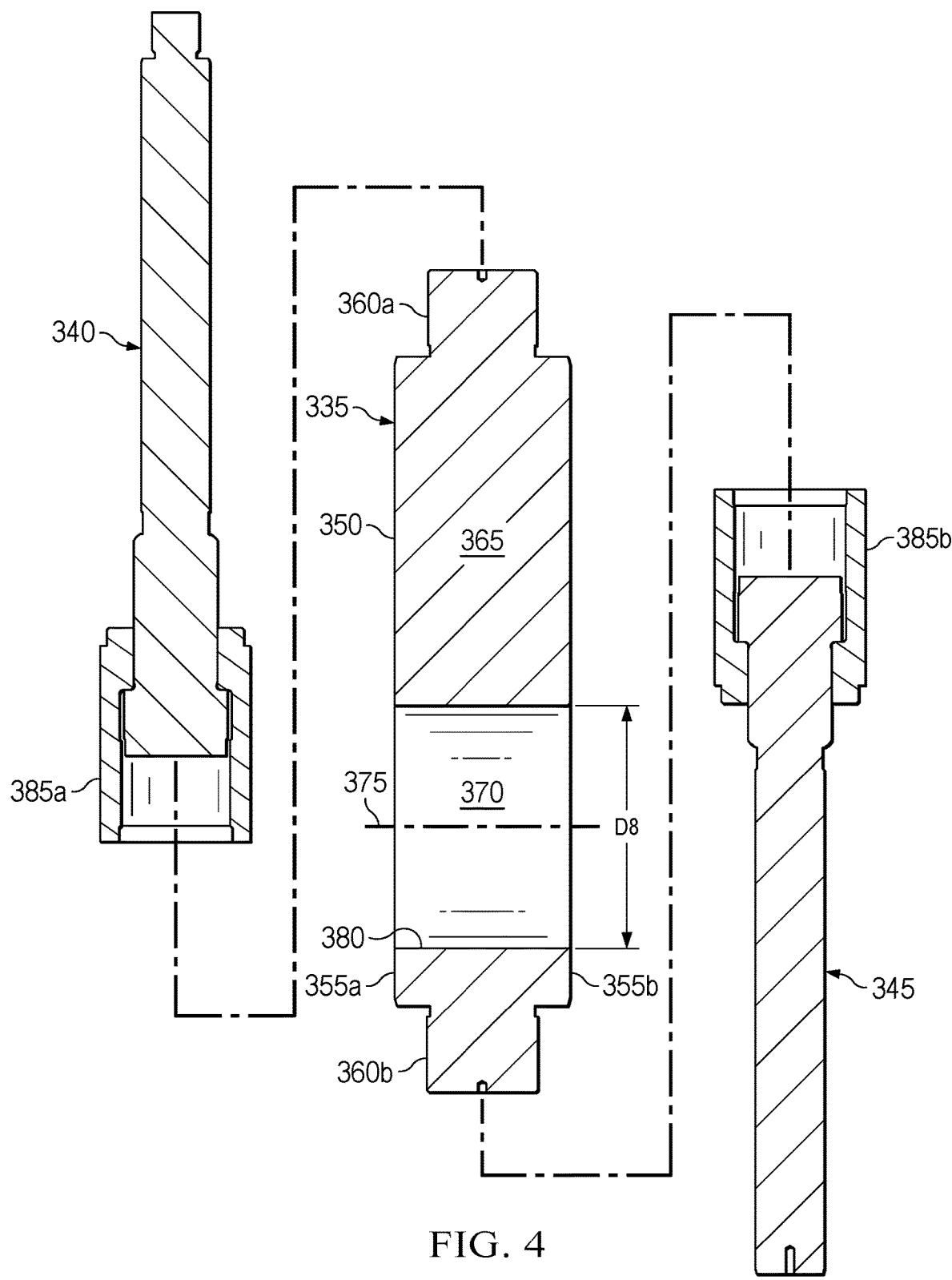
FIG. 4 is an exploded cross-sectional view of a gate assembly of FIG. 1's gate valve, according to one or more embodiments.

Referring to FIG. 4, with continuing reference to FIG. 1, in an embodiment, the gate assembly 115 includes a gate 335, an operating stem 340, and a balance stem 345. The gate 335 defines a gate body 350. The gate body 350 defines opposing side surfaces 355*a* and 355*b*. The operating stem 340 is connectable to an end portion 360*a* of the gate body 350. The balance stem 345 is connectable to an end portion 360*b* of the gate body 350, opposite the operating stem 340. A block 365 is defined proximate the end portion 360*a* of the gate 335. In some embodiments, the block 365 forms a solid mass that is free of any holes, gaps, cavities, openings, apertures, voids, or the like. In contrast, a fluid bore 370 extends through the gate body 350 of the gate 335, including the opposing side surfaces 355*a* and 355*b*, along a center axis 375 proximate the end portion 360*b*. The fluid bore 370 has an inside diameter D8 and defines an interior surface 380 in the gate 335. In some embodiments, the inside diameter D8 is the same as the inside diameter D3 of the interior surface 225 of the valve seat 190 and the inside diameter D7 of the interior surface 315 of the bore body 200. Alternatively, the fluid bore 370 may be located proximate the end portion 360*a* of the gate 335 and the block 365 may be located proximate the end portion 360*b* of the gate 335. The operating stem 340 and the balance stem 345 are connectable to the gate 335 via gate nuts 385*a* and 385*b*, respectively. In some embodiments, when the operating stem 340 and the balance stem 345 are coupled to the gate 335, the operating stem 340 and the balance stem 345 are co-axial. Moreover, in some embodiments, the operating stem 340 and the balance stem 345 are co-axial with the longitudinal axis 135 of the valve body 105 when the gate assembly 115 is installed in the valve body 105.

Figure 5:
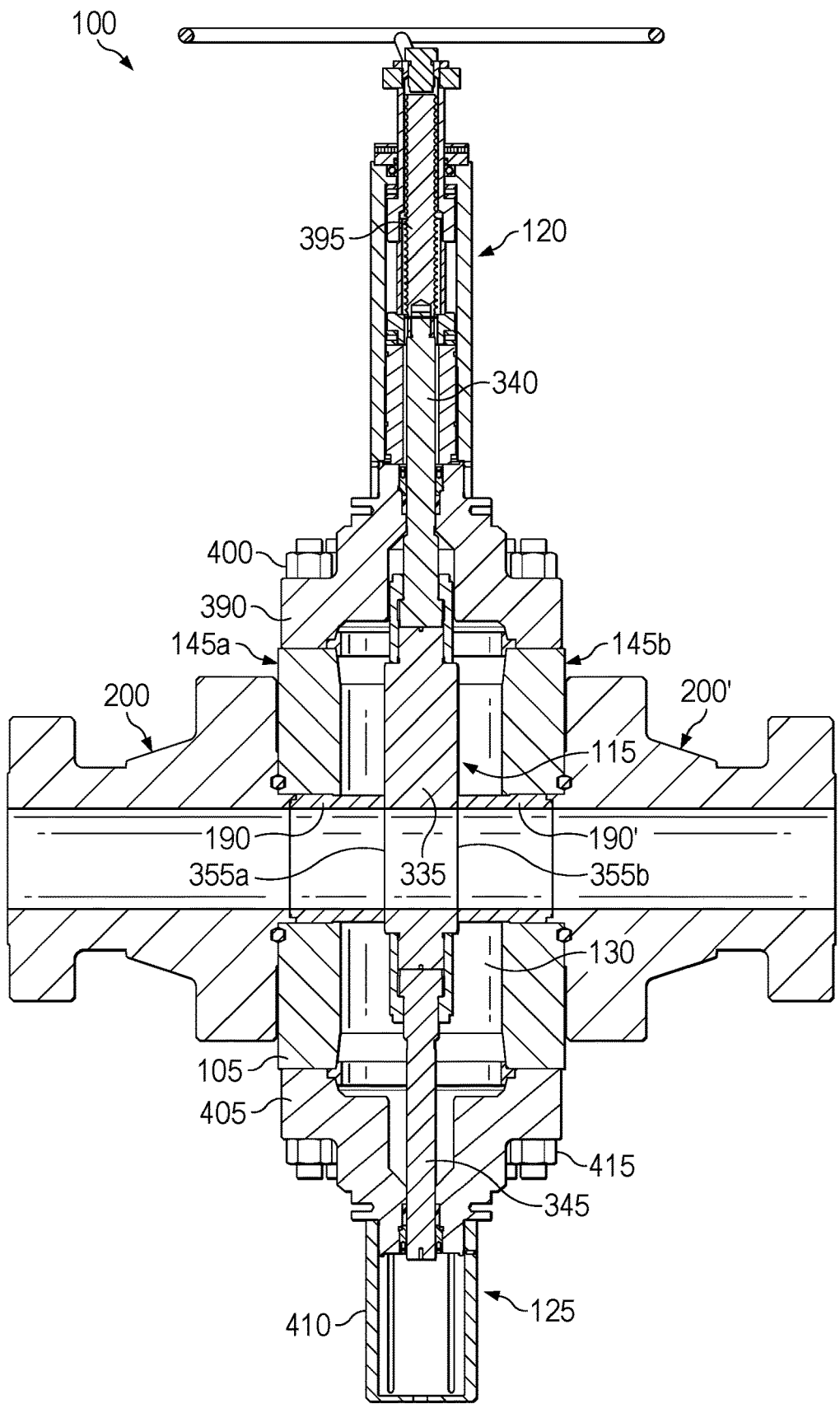
FIG. 5 is a cross-sectional view of FIG. 1's gate valve including the valve bore assembly of FIGS. 3A and 3B, according to one or more embodiments.

Referring to FIG. 5, with continuing reference to FIGS. 1, 2, 3A, 3B, and 4, in an embodiment, when the gate valve 100 is assembled: the gate assembly 115 extends within the valve cavity 130; the bore body 200 is coupled to the inlet side 145*a* of the valve body 105 to secure the valve seat 190 in sealing engagement with the side surface 355*a* of the gate 335; the bore body 200' is coupled to the outlet side 145*b* of the valve body 105 to secure the valve seat 190' in sealing engagement with the side surface 355*b* of the gate 335; the operating end 120 is coupled to the valve body 105 at one end of the valve cavity 130 to facilitate axial displacement of the gate assembly 115 between the open configuration and the closed configuration; and the balancing end 125 is coupled to the valve body 105 at the other end of the valve cavity 130. More particularly, the operating end 120 includes a bonnet 390 and a linear actuator such as, for example, a ball-screw assembly 395 coupled to the bonnet 390. The bonnet 390 is connectable to the valve body 105 via, for example, a plurality of fasteners 400. The ball-screw assembly 395 is adapted to displace the gate assembly 115 axially between the open configuration and the closed configuration. During such displacement, the operating end 120 is adapted to accommodate the gate nut 385a and seal against the operating stem 340. Additionally, the balancing end 125 includes a bonnet 405 and a stem protector 410. The stem protector 410 is coupled to the bonnet 405, which bonnet 405 is coupled to the valve body 105, opposite the bonnet 390 of the operating end 120, via, for example, a plurality of fasteners 415 (shown in FIG. 1). During the displacement of the gate assembly 115 between the open configuration and the closed configuration, the balancing end 125 is adapted to accommodate the gate nut 385b and seal against the balance stem 345.

Figure 6:
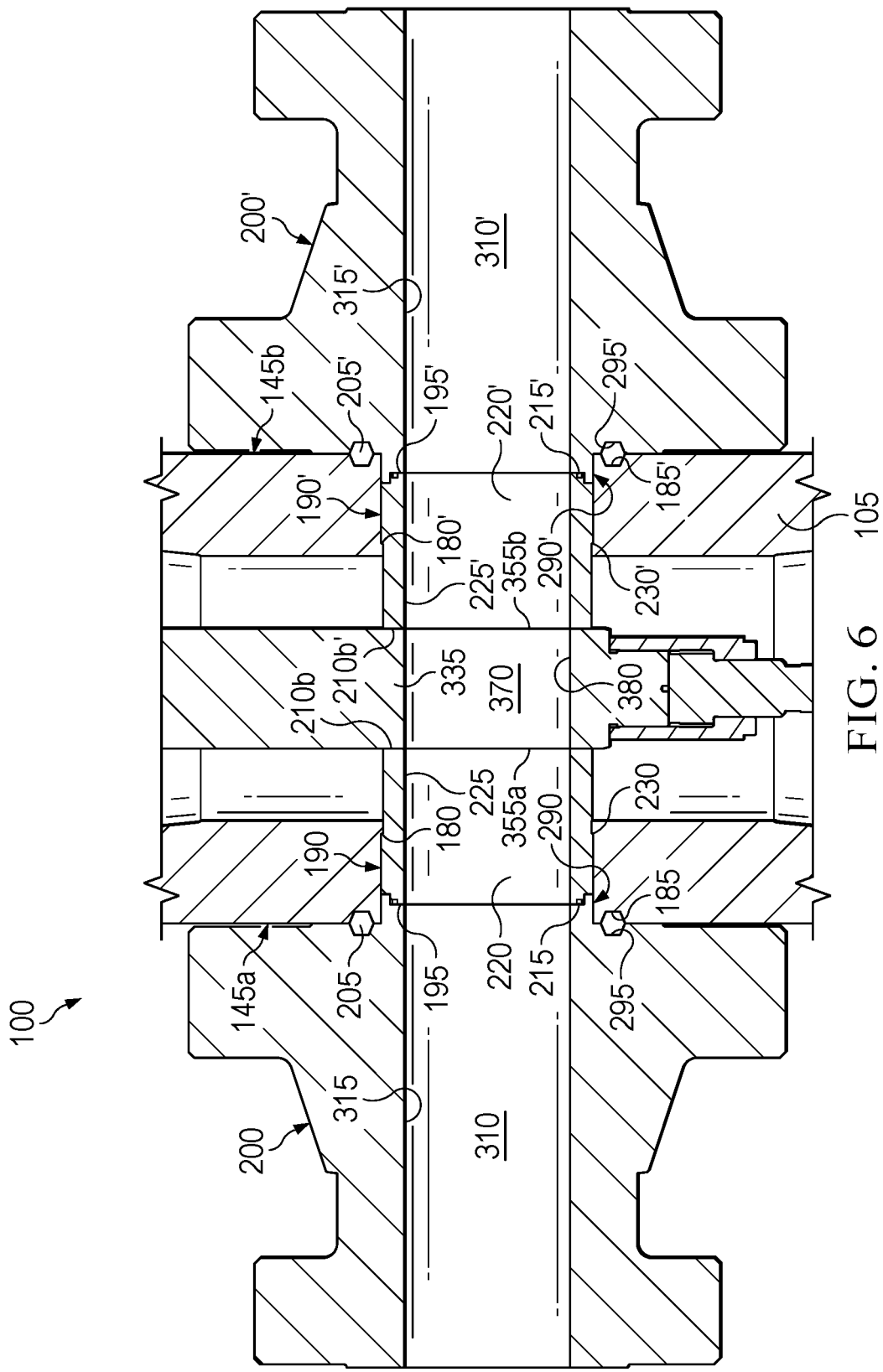
FIG. 6 is an enlarged cross-sectional view of FIG. 5's gate valve, according to one or more embodiments.

Referring to FIG. 6, with continuing reference to FIG. 5, in an embodiment, when the bore body 200 is coupled to the inlet side 145a of the valve body 105 to secure the valve seat 190 in sealing engagement with the side surface 355a of the gate 335: the seal 205 extends within the annular grooves 185 and 295 and sealingly engages the valve body 105 and the bore body 200; the seal 195 is disposed between (i.e., the seal 195 extends within the annular groove 215), and sealingly engages, the valve seat 190 and the bore body 200; and the external shoulder 230 of the valve seat 190 engages the internal shoulder 180 of the valve body 105. As a result, the end face 210b of the valve seat 190 sealingly engages the side surface 355a of the gate 335. Moreover, the boss 290 extends into the inlet passageway 155 so that: the end face 305 of the bore body 200 extends adjacent the seat face 245 of the valve seat 190; the interior surface 330 of the bore body 200 extends adjacent the exterior surface 250 of the valve seat 190; and the sealing face 325 of the bore body 200 extends adjacent the end face 210a of the valve seat 190. Likewise, when the bore body 200' is coupled to the outlet side 145a of the valve body 105 to secure the valve seat 190' in sealing engagement with the side surface 355b of the gate 335: the seal 205' extends within the annular grooves 185' and 295' and sealingly engages the valve body 105 and the bore body 200'; the seal 195' is disposed between (i.e., the seal 195' extends within the annular groove 215'), and sealingly engages, the valve seat 190' and the bore body 200'; and the external shoulder 230' of the valve seat 190' engages the internal shoulder 180' of the valve body 105. As a result, the end face 210b' of the valve seat 190' sealingly engages the side surface 355b of the gate 335. Moreover, the boss 290' extends into the outlet passageway 155' so that: the end face 305' of the bore body 200' extends adjacent the seat face 245' of the valve seat 190'; the interior surface 330' of the bore body 200' extends adjacent the exterior surface 250' of the valve seat 190'; and the sealing face 325' of the bore body 200' extends adjacent the end face 210a' of the valve seat 190'.

In operation, the gate 335 is constrained at the side surface 355a by the valve seat 190 and, at the side surface 355b, by the valve seat 190'. The valve cavity 130 around the gate 335 is pressurized with grease (or another type of lubricant). Moreover, the fluid bore(s) 220, 220',310, 310', and/or 370 (shown most clearly in FIG. 1B) of the gate valve 100 is/are pressurized with process fluid. During operation, the pressurized grease in the valve cavity 130 migrates between the gate 335 and the respective valve seats 190 and 190' (i.e., across the respective end faces 210b and 210b') and into the process fluid flowing within the fluid bore(s) 220, 220',310, 310', and/or 370. In several embodiments, the pressurized grease provides a barrier against solid particles (e.g., sand, fines, debris, etc.) within the process fluid, with the barrier preventing, or at least resisting, the solid particles from getting behind, or otherwise bypassing, the gate 335 and entering, for example, the valve cavity 130. The migration of the grease across the respective end faces 210b and 210b' facilitates: sealing engagement between the valve seats 190 and 190' and the gate 335; translational movement of the gate 335 between the open configuration and the closed configuration; resistance to solid particles (e.g., sand, fines, debris, etc.) within the process fluid from getting behind, or otherwise bypassing, the gate 335 and entering into, for example, the valve cavity 130; or any combination of the foregoing. To promote such migration, the grease in the valve cavity 130 may be pressurized to a greater degree than the process fluid flowing within the fluid bore(s) 220, 220',310, 310', and/or 370.

In the open configuration, the interior surface 380 defined in the gate 335 by the fluid bore 370 is aligned with the interior surface 225 defined in the valve seat 190 by the fluid bore 220 and the interior surface 225' defined in the valve seat 190' by the fluid bore 220'; the interior surface 315 defined in the bore body 200 by the fluid bore 310 is aligned with the interior surface 225 defined in the valve seat 190 by the fluid bore 220; and the interior surface 315' defined in the bore body 200' by the fluid bore 310' is aligned with the interior surface 225' defined in the valve seat 190' by the fluid bore 220'. As a result, unimpeded fluid flow is permitted through the gate valve 100 via the fluid bores 220, 220',310, 310', and 370. In the closed configuration, the block 365 of the gate 335 is aligned with the interior surface 225 defined in the valve seat 190 by the fluid bore 220 and the interior surface 225' defined in the valve seat 190' by the fluid bore 220'. As a result, the block 365 prevents fluid flow through the gate valve 100 by offsetting the fluid bore 370 from the fluid bores 220, 220',310, 310', and 370.

Figure 7A:
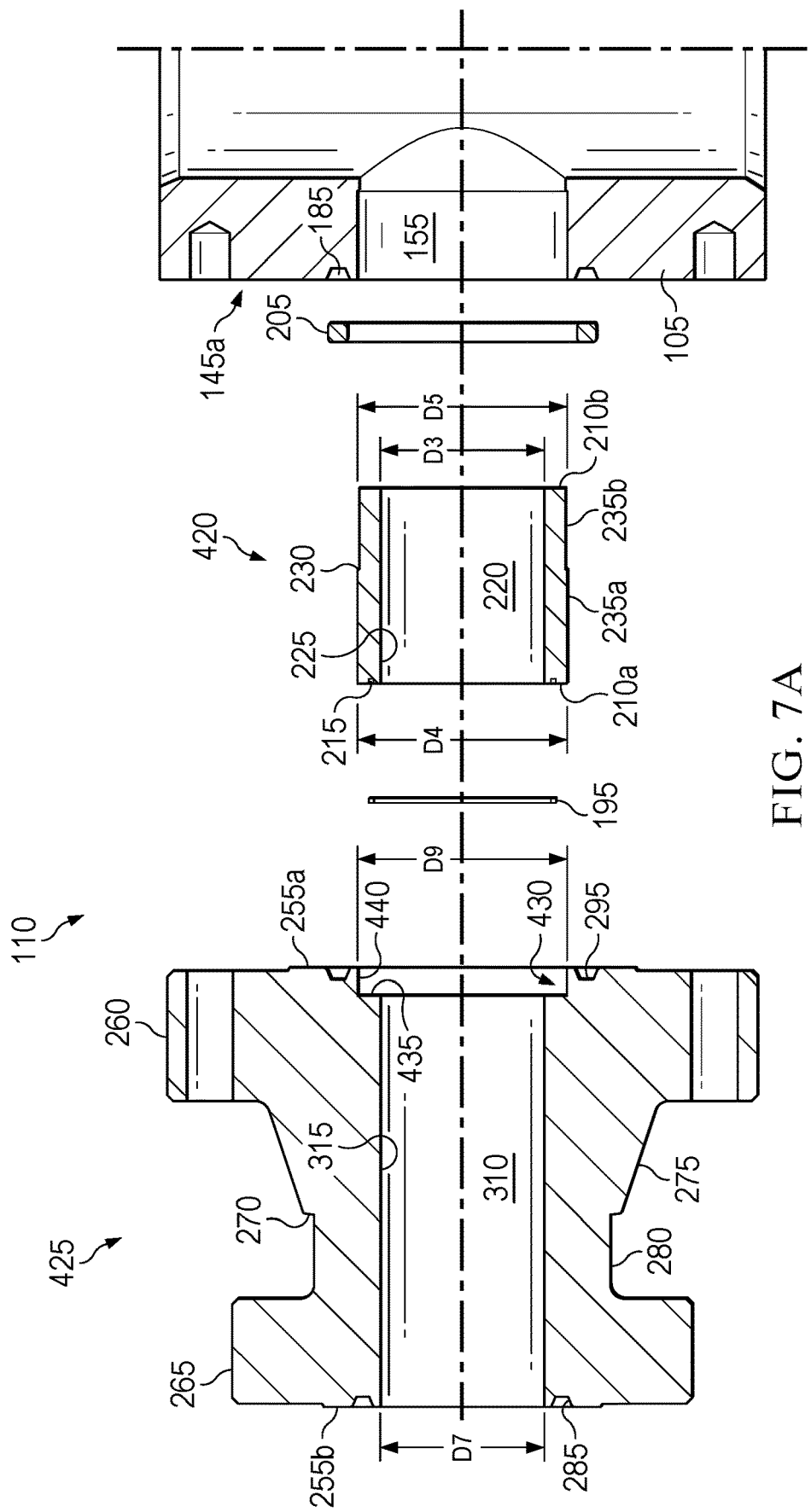
FIG. 7A is an exploded cross-sectional view of a first portion of another valve bore assembly of FIG. 1's gate valve corresponding to the inlet side of FIG. 2's valve body, according to one or more embodiments.

Referring to FIG. 7A, with continuing reference to FIG. 3A, in an embodiment, the valve seat 190 and the bore body 200 are omitted from the valve bore assembly 110 and replaced with a valve seat 420 and a bore body 425. The valve seat 420 includes various features that are substantially identical to corresponding features of the valve seat 190, which substantially identical features are given the same reference numerals. However, the annular recess 240 is omitted from the valve seat 420 so that the end face 210a adjoins the exterior surface 235a. Moreover, the valve seat 420 has a length greater than that of the valve seat 190. In some embodiments, an annular groove is formed into the exterior surface 235a of the valve seat 420 to accommodate a seal adapted to sealingly engage the valve seat 420 and the valve body 105. In addition, or instead, an annular groove may be formed into the exterior surface 235b of the valve seat 420 to accommodate a seal adapted to sealingly engage the valve seat 420 and the bore body 425. Likewise, the bore body 425 includes various features that are substantially identical to corresponding features of the bore body 200, which substantially identical features are given the same reference numerals. However, the boss 290 is omitted from the bore body 425 and replaced by an annular recess 430 formed into both the interior surface 315 and the end face 255a. The annular recess 430 defines a sealing face 435 and an interior surface 440 in the bore body 425. The sealing face 435 adjoins both the interior surface 315 and the interior surface 440. The interior surface 440 also adjoins the end face 255a and defines an inside diameter D9. The inside diameter D9 is greater than the outside diameter D4 of the exterior surface 235a of the valve seat 420.

Figure 7B:
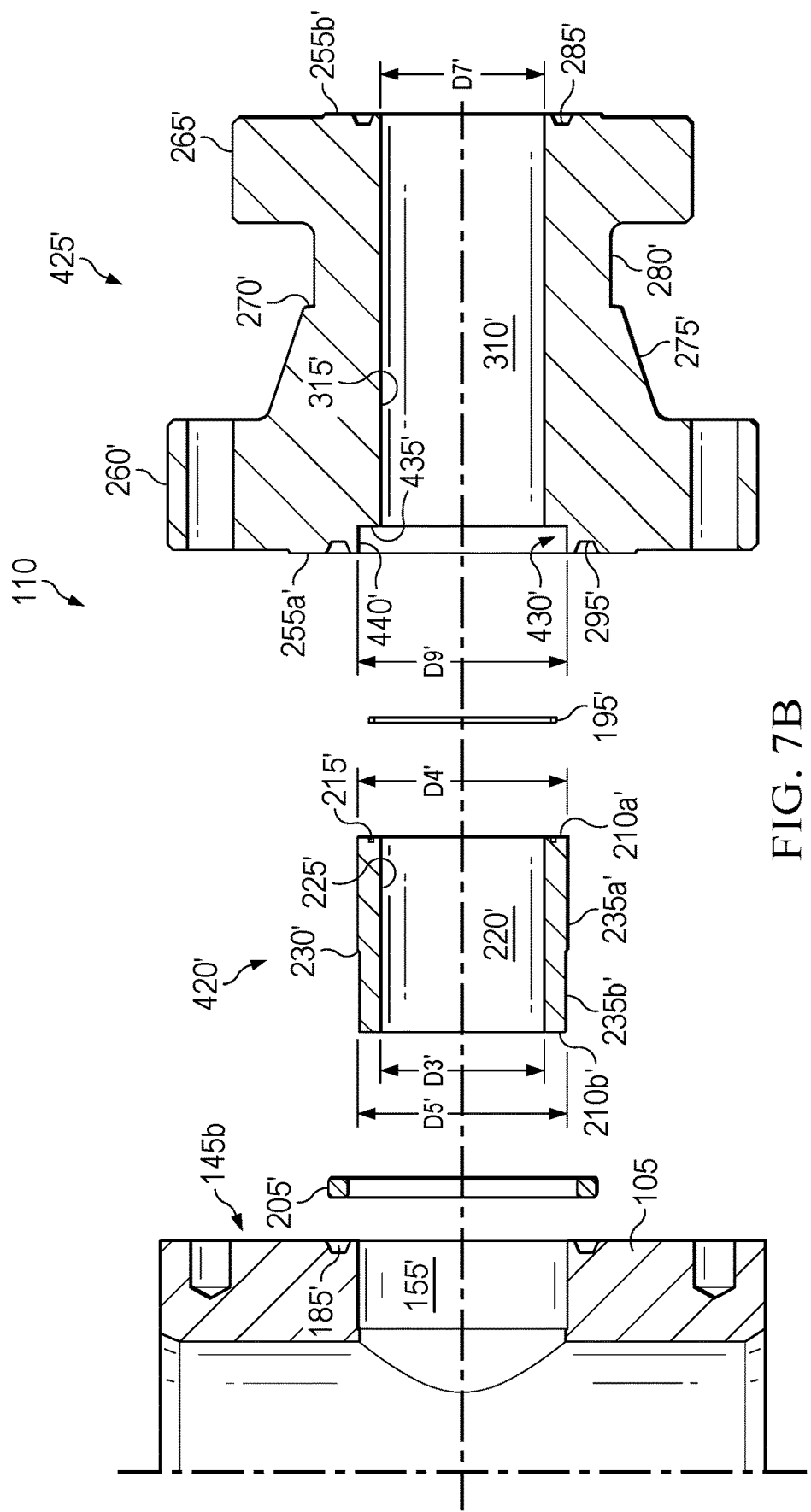
FIG. 7B is an exploded cross-sectional view of a second portion of the another valve bore assembly of FIG. 1's gate valve corresponding to the outlet side of FIG. 2's valve body, according to one or more embodiments.

Referring to FIG. 7B, with continuing reference to FIG. 7A, in an embodiment, in addition to the 420, the seal 195, the bore body 425, and the seal 205, all of which are associated with the inlet side 145a of the valve body 105, the valve bore assembly 110 includes various substantially identical features/components associated with the outlet side 145*b* of the valve body 105, which substantially identical features/components are given the same reference numerals, except that the suffix "'" is added. More particularly, the valve seat 190' and the bore body 200' are omitted from the valve bore assembly 110 and replaced with the valve seat 420' and the bore body 425'.

Figure 8:
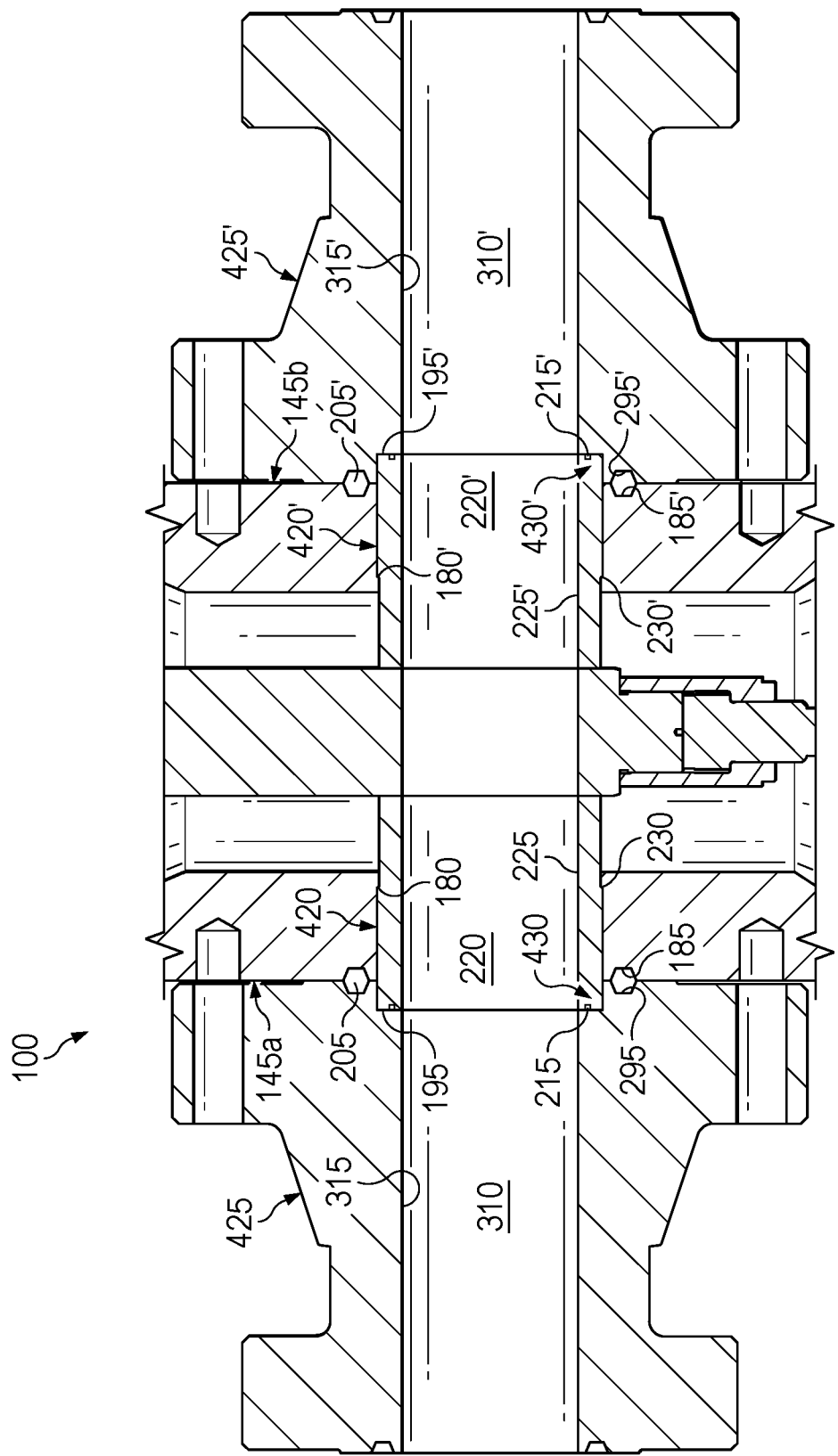
FIG. 8 is an enlarged cross-sectional view of FIG. 1's gate valve including the valve bore assembly of FIGS. 7A and 7B, according to one or more embodiments.

Referring to FIG. 8, with continuing reference to FIGS. 7A and 7B, in an embodiment, when the gate valve 100 is assembled: the gate assembly 115 extends within the valve cavity 130; the bore body 425 is coupled to the inlet side 145*a* of the valve body 105 to secure the valve seat 420 in sealing engagement with the side surface 355*a* of the gate 335; the bore body 425' is coupled to the outlet side 145*b* of the valve body 105 to secure the valve seat 420' in sealing engagement with the side surface 355*b* of the gate 335; the operating end 120 is coupled to the valve body 105 at one end of the valve cavity 130 to facilitate axial displacement of the gate assembly 115 between the open configuration and the closed configuration, as shown and described above in connection with FIG. 5; and the balancing end 125 is coupled to the valve body 105 at the other end of the valve cavity 130, as shown and described above in connection with FIG. 5.

When the bore body 425 is coupled to the inlet side 145*a* of the valve body 105 to secure the valve seat 420 in sealing engagement with the side surface 355*a* of the gate 335: the seal 205 extends within the annular grooves 185 and 295 and sealingly engages the valve body 105 and the bore body 425; the seal 195 is disposed between (i.e., the seal 195 extends within the annular groove 215), and sealingly engages, the valve seat 420 and the bore body 425; and the external shoulder 230 of the valve seat 420 engages the internal shoulder 180 of the valve body 105. As a result, the end face 210*b* of the valve seat 420 sealingly engages the side surface 355*a* of the gate 335. Moreover, the valve seat 420 extends into the annular recess 430 of the bore body 425 so that: the exterior surface 235*a* of the valve seat 420 extends adjacent the interior surface 440 of the bore body 425; and the end face 210*a* of the valve seat 420 extends adjacent the sealing face 435 of the bore body 425. Likewise, when the bore body 425' is coupled to the outlet side 145*a* of the valve body 105 to secure the valve seat 420' in sealing engagement with the side surface 355*b* of the gate 335: the seal 205' extends within the annular grooves 185' and 295' and sealingly engages the valve body 105 and the bore body 425'; the seal 195' is disposed between (i.e., the seal 195' extends within the annular groove 215'), and sealingly engages, the valve seat 420' and the bore body 425'; and the external shoulder 230' of the valve seat 420' engages the internal shoulder 180' of the valve body 105. As a result, the end face 210*b*' of the valve seat 420' sealingly engages the side surface 355*b* of the gate 335. Moreover, the valve seat 420' extends into the annular recess 430' of the bore body 425' so that: the exterior surface 235*a*' of the valve seat 420' extends adjacent the interior surface 440' of the bore body 425'; and the end face 210*a*' of the valve seat 420' extends adjacent the sealing face 435' of the bore body 425'.

In operation, the gate 335 is constrained at the side surface 355*a* by the valve seat 420 and, at the side surface 355*b*, by the valve seat 420'. The valve cavity 130 around the gate 335 is pressurized with grease (or another type of lubricant). Moreover, the fluid bore(s) 220, 220', 310, 310', and/or 370 (shown most clearly in FIG. 1B) of the gate valve 100 is/are pressurized with process fluid. During operation, the pressurized grease in the valve cavity 130 migrates between the gate 335 and the respective valve seats 420 and 420' (i.e., across the respective end faces 210*b* and 210*b*') and into the process fluid flowing within the fluid bore(s) 220, 220', 310, 310', and/or 370. In several embodiments, the pressurized grease provides a barrier against solid particles (e.g., sand, fines, debris, etc.) within the process fluid, with the barrier preventing, or at least resisting, the solid particles from getting behind, or otherwise bypassing, the gate 335 and entering, for example, the valve cavity 130. The migration of the grease across the respective end faces 210*b* and 210*b*' facilitates: sealing engagement between the valve seats 420 and 420' and the gate 335; translational movement of the gate 335 between the open configuration and the closed configuration; resistance to solid particles (e.g., sand, fines, debris, etc.) within the process fluid from getting behind, or otherwise bypassing, the gate 335 and entering into, for example, the valve cavity 130; or any combination of the foregoing. To promote such migration, the grease in the valve cavity 130 may be pressurized to a greater degree than the process fluid flowing within the fluid bore(s) 220, 220', 310, 310', and/or 370.

In the open configuration, the interior surface 380 defined in the gate 335 by the fluid bore 370 is aligned with the interior surface 225 defined in the valve seat 420 by the fluid bore 220 and the interior surface 225' defined in the valve seat 420' by the fluid bore 220'; the interior surface 315 defined in the bore body 425 by the fluid bore 310 is aligned with the interior surface 225 defined in the valve seat 420 by the fluid bore 220; and the interior surface 315' defined in the bore body 425' by the fluid bore 310' is aligned with the interior surface 225' defined in the valve seat 420' by the fluid bore 220'. As a result, unimpeded fluid flow is permitted through the gate valve 100 via the fluid bores 220, 220', 310, 310', and 370. In the closed configuration, the block 365 of the gate 335 is aligned with the interior surface 225 defined in the valve seat 420 by the fluid bore 220 and the interior surface 225' defined in the valve seat 420' by the fluid bore 220'. As a result, the block 365 prevents fluid flow through the gate valve 100 by offsetting the fluid bore 370 from the fluid bores 220, 220', 310, 310', and 370.

Various features/components have been described herein as having an annular groove formed therein to accommodate a seal for sealingly engaging an adjacent surface; however, in every such instance described herein, the annular groove may be omitted and replaced with another annular groove in the adjacent surface for accommodating the corresponding seal.

Although described herein as including the valve body 105, an existing valve body of an existing gate valve may instead be retrofitted (via additive and/or subtractive material processes) to accommodate the valve bore assembly 110, according to one or more embodiments of the present disclosure. Thus, the valve bore assembly 110 may be provided as a kit for retrofitting an existing gate valve so that said existing gate valve's valve body is able to accommodate the valve bore assembly 110.

The present disclosure introduces a valve apparatus according to a first aspect. The valve apparatus according to the first aspect generally includes: a valve body, the valve body defining: a valve cavity; and a passageway extending from the valve cavity, the passageway defining a first interior surface in the valve body, the first interior surface having a first inside diameter, wherein an annular recess is formed into the first interior surface, the annular recess defining a second interior surface and an internal shoulder in the valve body, the second interior surface having a second inside diameter that is greater than the first inside diameter, and wherein the first interior surface is positioned relatively closer to the valve cavity than the second interior surface; a gate body extending within the valve cavity; and a valve seat extending within both the passageway and the valve cavity, the valve seat defining: a first exterior surface having a first outside diameter; a second exterior surface having a second outside diameter that is greater than the first outside diameter; and an external shoulder between the first and second exterior surfaces; wherein the external shoulder of the valve seat engages the internal shoulder defined in the valve body; and wherein the valve seat sealingly engages the gate body. In one or more embodiments, a portion of the valve seat extends outside the valve body. In one or more embodiments, the valve apparatus further includes a bore body; wherein at least a first portion of the bore body extends outside the valve body; and wherein the bore body engages both the valve body and the valve seat to secure the valve seat in sealing engagement with the gate body. In one or more embodiments, the valve apparatus further includes a seal; wherein the seal is disposed between, and sealingly engages, the valve seat and the bore body. In one or more embodiments, the valve apparatus further includes a seal; wherein the seal is disposed between, and sealingly engages, the valve body and the bore body. In one or more embodiments, a second portion of the bore body extends into the passageway. In one or more embodiments, a first fluid bore extends through the valve seat, defining a third interior surface in the valve seat, the third interior surface having a third inside diameter; and a second fluid bore extends through the bore body, defining a fourth interior surface in the bore body, the fourth interior surface having a fourth inside diameter that is the same as the third inside diameter.

The present disclosure also introduces a valve apparatus according to a second aspect. The valve apparatus according to the second aspect generally includes: a valve seat, wherein the valve seat is adapted to extend within both a valve cavity of a valve body and a passageway of the valve body, said passageway extending from said valve cavity, and wherein, when the valve seat extends within both the valve cavity and the passageway, the valve seat is further adapted to: engage the valve body; and sealingly engage a gate body; and a bore body, wherein at least a first portion of the bore body is adapted to extend outside the valve body, and wherein, when the valve seat extends within both the valve cavity and the passageway, the valve seat engages the valve body and sealingly engages the gate body, and the first portion of the bore body extends outside the valve body: the bore body is further adapted to engage both the valve body and the valve seat to secure the valve seat in sealing engagement with the gate body. In one or more embodiments, the valve seat defines an external shoulder; and the external shoulder of the valve seat is adapted to engage an internal shoulder defined in the valve body. In one or more embodiments, when the valve seat extends within both the valve cavity and the passageway, and the valve seat engages the valve body and sealingly engages the gate body: a portion of the valve seat is adapted to extend outside the valve body. In one or more embodiments, the valve apparatus further includes the valve body. In one or more embodiments, the valve apparatus further includes a seal; wherein, when the valve seat extends within both the valve cavity and the passageway, the valve seat engages the valve body and sealingly engages the gate body, and the at least a first portion of the bore body extends outside the valve body: the seal is adapted to be disposed between, and sealingly engage, the valve seat and the bore body. In one or more embodiments, the valve apparatus further includes a seal; wherein, when the valve seat extends within both the valve cavity and the passageway, the valve seat engages the valve body and sealingly engages the gate body, and the at least a first portion of the bore body extends outside the valve body: the seal is adapted to be disposed between, and sealingly engage, the valve body and the bore body. In one or more embodiments, when the valve seat extends within both the valve cavity and the passageway, the valve seat engages the valve body and sealingly engages the gate body, and the first portion of the bore body extends outside the valve body: a second portion of the bore body is adapted to extend into the passageway. In one or more embodiments, a first fluid bore extends through the valve seat, defining a first interior surface in the valve seat, the first interior surface having a first inside diameter; and a second fluid bore extends through the bore body, defining a second interior surface in the bore body, the second interior surface having a second inside diameter that is the same as the first inside diameter. In one or more embodiments, the valve apparatus further includes the gate body; wherein the gate body is adapted to extend within the valve cavity.

The present disclosure also introduces a valve apparatus according to a third aspect. The valve apparatus according to the third aspect generally includes: a valve body, the valve body defining: a valve cavity; and a passageway extending from the valve cavity; a gate body extending within the valve cavity; a valve seat extending within both the passageway and the valve cavity; a bore body that engages both the valve body and the valve seat to secure the valve seat in sealing engagement with the gate body; and a first seal disposed between, and sealingly engaging, the valve seat and the bore body; wherein at least a first portion of the bore body extends outside the valve body. In one or more embodiments, a portion of the valve seat extends outside the valve body. In one or more embodiments, the valve apparatus further includes a second seal; wherein the second seal sealingly engages both the valve body and the bore body. In one or more embodiments, a second portion of the bore body extends into the passageway. In one or more embodiments, a first fluid bore extends through the valve seat, defining a first interior surface in the valve seat, the first interior surface having a first inside diameter; and a second fluid bore extends through the bore body, defining a second interior surface in the bore body, the second interior surface having a second inside diameter that is the same as the first inside diameter.

It is understood that variations may be made in the foregoing without departing from the scope of the present disclosure.

In several embodiments, the elements and teachings of the various embodiments may be combined in whole or in part in some or all of the embodiments. In addition, one or more of the elements and teachings of the various embodiments may be omitted, at least in part, and/or combined, at least in part, with one or more of the other elements and teachings of the various embodiments.

Any spatial references, such as, for example, "upper," "lower," "above," "below," "between," "bottom," "vertical," "horizontal," "angular," "upwards," "downwards," "side-to-side," "left-to-right," "right-to-left," "top-to-bottom," "bottom-to-top," "top," "bottom," "bottom-up," "top-down," etc., are for the purpose of illustration only and do not limit the specific orientation or location of the structure described above.

In several embodiments, while different steps, processes, and procedures are described as appearing as distinct acts, one or more of the steps, one or more of the processes, and/or one or more of the procedures may also be performed in different orders, simultaneously and/or sequentially. In several embodiments, the steps, processes, and/or procedures may be merged into one or more steps, processes and/or procedures.

In several embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although several embodiments have been described in detail above, the embodiments described are illustrative only and are not limiting, and those skilled in the art will readily appreciate that many other modifications, changes and/or substitutions are possible in the embodiments without materially departing from the novel teachings and advantages of the present disclosure. Accordingly, all such modifications, changes, and/or substitutions are intended to be included within the scope of this disclosure as defined in the following claims. In the claims, any means-plus-function clauses are intended to cover the structures described herein as performing the recited function and not only structural equivalents, but also equivalent structures. Moreover, it is the express intention of the applicant not to invoke 35 U.S.C. § 112(f) for any limitations of any of the claims herein, except for those in which the claim expressly uses the word "means" together with an associated function.

What is claimed is:

1. A valve apparatus, comprising:
   a valve body, the valve body defining:
      a valve cavity; and
      a passageway extending from the valve cavity, the passageway defining a first interior surface in the valve body, the first interior surface having a first inside diameter,
         wherein an annular recess is formed into the first interior surface, the annular recess defining a second interior surface and an internal shoulder in the valve body, the second interior surface having a second inside diameter that is greater than the first inside diameter, and
         wherein the first interior surface is positioned relatively closer to the valve cavity than the second interior surface;
   a gate body extending within the valve cavity;
   a valve seat extending within both the passageway and the valve cavity, the valve seat defining:
      a first exterior surface having a first outside diameter;
      a second exterior surface having a second outside diameter that is greater than the first outside diameter; and
      an external shoulder between the first and second exterior surfaces, the external shoulder extending uninterruptedly from the first exterior surface to the second exterior surface;
   and
   a bore body that engages both the valve body and the valve seat to secure the valve seat in engagement with the gate body;
   wherein the external shoulder of the valve seat engages the internal shoulder defined in the valve body;
   wherein the first exterior surface of the valve seat engages the first interior surface of the valve body;
   wherein the valve seat comprises a first end and a second end, wherein the first end of the valve seat extends outside the valve body; and wherein the second end of the valve seat extends within the valve cavity;
   and
   wherein the valve seat is integrally formed from a material, the material extending uninterruptedly from the first end to the second end of the valve seat, so that the material from which the valve seat is integrally formed extends outside the valve body and engages the bore body at the first end, and extends within the valve cavity and engages the gate body at the second end.

2. The valve apparatus of claim 1, further comprising a seal;
   wherein the seal is disposed between, and sealingly engages, the valve seat and the bore body.

3. The valve apparatus of claim 1, further comprising a seal;
   wherein the seal is disposed between, and sealingly engages, the valve body and the bore body.

4. The valve apparatus of claim 1, wherein a portion of the bore body extends into the passageway.

5. The valve apparatus of claim 1, wherein a first fluid bore extends through the valve seat, defining a third interior surface in the valve seat, the third interior surface having a third inside diameter; and
   wherein a second fluid bore extends through the bore body, defining a fourth interior surface in the bore body, the fourth interior surface having a fourth inside diameter that is the same as the third inside diameter.

* * * * *